United States Patent
Kotov et al.

[11] 3,803,767
[45] Apr. 16, 1974

[54] MACHINE-TOOL FOR MACHINING GEAR TEETH

[76] Inventors: Vladimir Andreevich Kotov, Sadovnicheskaya, naberezhnaya, 61, kv. 7; Mikhail Pinievich Kvitko, Khoroshevskaya ulitsa, 15, kv. 158; Igor Ivanovich Kirichinsky, Taganskaya ulitsa, 24, kv. 41, all of Moscow, U.S.S.R.

[22] Filed: Nov. 3, 1971

[21] Appl. No.: 195,182

Related U.S. Application Data

[63] Continuation-in-part of Ser. No. 854,111, Aug. 29, 1969, abandoned.

[52] U.S. Cl............................ 51/33 R, 51/99, 51/234
[51] Int. Cl............................................. B24b 7/00
[58] Field of Search................. 51/33 R, 55, 234, 99

[56] References Cited
UNITED STATES PATENTS

| | | | |
|---|---|---|---|
| 2,723,598 | 11/1955 | Mann | 51/99 X |
| 2,932,923 | 4/1960 | Carlsen | 51/33 R |
| 3,030,739 | 4/1962 | Folley | 51/33 R |
| 3,089,287 | 5/1963 | Dilks | 51/99 X |

*Primary Examiner*—Donald G. Kelly
*Assistant Examiner*—Howard N. Goldberg
*Attorney, Agent, or Firm*—Eric H. Waters

[57] ABSTRACT

A machine for form grinding a tooth side of a spiral bevel gear having a wide pitch angle and a profile angle variable between the tooth ends comprising a spindle carrying a gear blank in a fixed position, the spindle being mounted on a carrier swingable about a horizontal axis; a rotary tool oscillatable about a vertical axis; and a means for simultaneously effecting the swinging movement of the carrier and the oscillating movement of the rotary tool.

2 Claims, 4 Drawing Figures

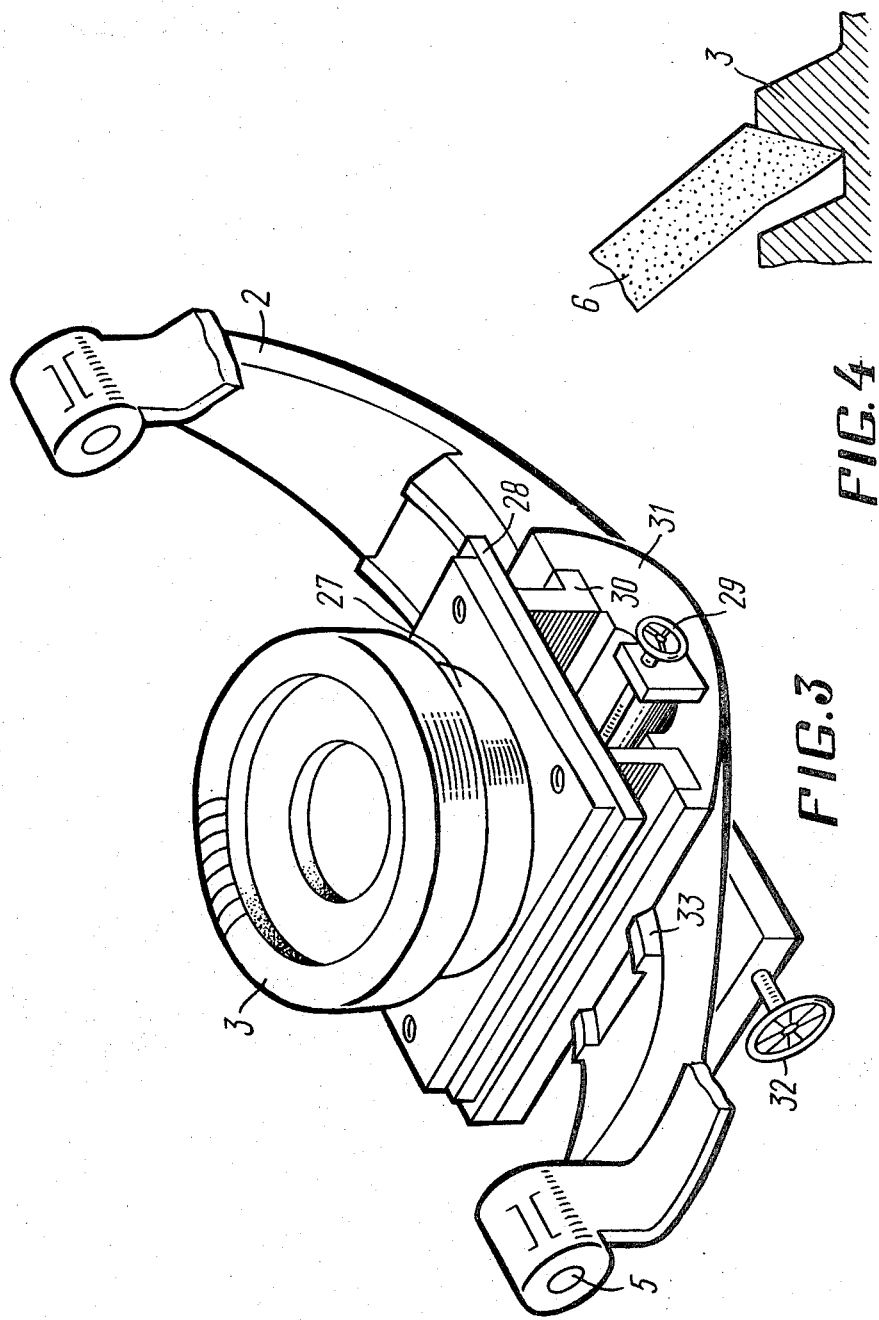

MACHINE-TOOL FOR MACHINING GEAR TEETH

This application is a continuation-in-part of U.S. Pat. application Ser. No. 854,111, filed Aug. 29, 1969, now abandoned.

The invention relates to a machine for grinding gears, and more particularly to a machine for form grinding by a longitudinally fed dish wheel a tooth side of a spiral bevel gear having a wide pitch angle and a profile angle variable between the tooth ends.

Most effectively the present invention can be used for grinding a tooth side of a tooth-rolling die with a pitch angle 75° and higher and a profile angle variable between the tooth ends, which is used on a tooth rolling machine for producing a Formate spiral bevel gear for an automotive rear axle drive.

It is generally known that the driven member of a Formate pair of gears is produced without any generating motion and has arcuate teeth with straight profile. The profile angle of that gear varies between the ends of the teeth thereof in such a manner that on the convex side of a tooth the profile angle increases from the outer to the inner end of the tooth, for example from 18° to 22°, while on the concave side the profile angle diminishes from the outer to the inner end, for example from 22° to 18°.

A tooth-rolling die which is preferably ground on a machine according to the present invention has a tooth form negative to that of a Formate driven gear. Therefore, the profile angle on the convex side of a tooth of a rolling die diminishes from the outer to the inner end of the tooth, while on the concave side the variation is of a reverse character.

Known from the U.S. Pat. No. 1,811,254 is a machine for form grinding a tooth side of a spiral bevel gear in which the profile of the tooth surface varies between the ends of the teeth. This known machine comprises a means for holding a gear blank in a fixed position, a rotary tool in the shape of a form-grinding wheel supported on a tool head, a means for imparting to the wheel compound three-dimensional oscillating movements relative to the curved surface of the tooth being ground, and a means enabling a simultaneous and correlated accomplishment of the compound oscillating movements of the grinding wheel.

The means for imparting to the grinding wheel compound oscillating movements relative to the curved surface of the tooth being ground comprises two pivotably connected supporting elements set into motion through a long and complex train of motion transmission means comprising a plurality of pivotably connected levers and gearing mechanisms.

The known machine has a complicated and cumbersome construction and is difficult in operation and maintenance due to the concentration of the compound oscillating movements on the grinding wheel.

Accordingly a main object of the invention is to provide a machine tool of the kind referred to which has a simpler construction and is easier in operation and maintenance.

Another object of the invention is to provide a machine tool of the kind referred to which is extremely practical in design and can be relatively easily and economically manufactured.

A further object of the invention is to provide a machine tool which includes means for imparting both to the grinding wheel and to the gear blank simple oscillating movements in intersecting planes.

A still further object of the invention is to provide a machine tool having simple and reliable means for effecting simultaneously oscillating movements of the grinding wheel and the gear blank.

Other objects and advantages of the invention will become apparent from the following description when it is considered in conjunction with the appended claims and the accompanying drawings, in which:

FIG. 3 is a detail perspective view of the blank-holding means of FIG. 1.

FIG. 4 is a diagrammatic sectional view showing the position of the cutting portion of the grinding wheel with respect to a tooth side being ground.

Figure 1:
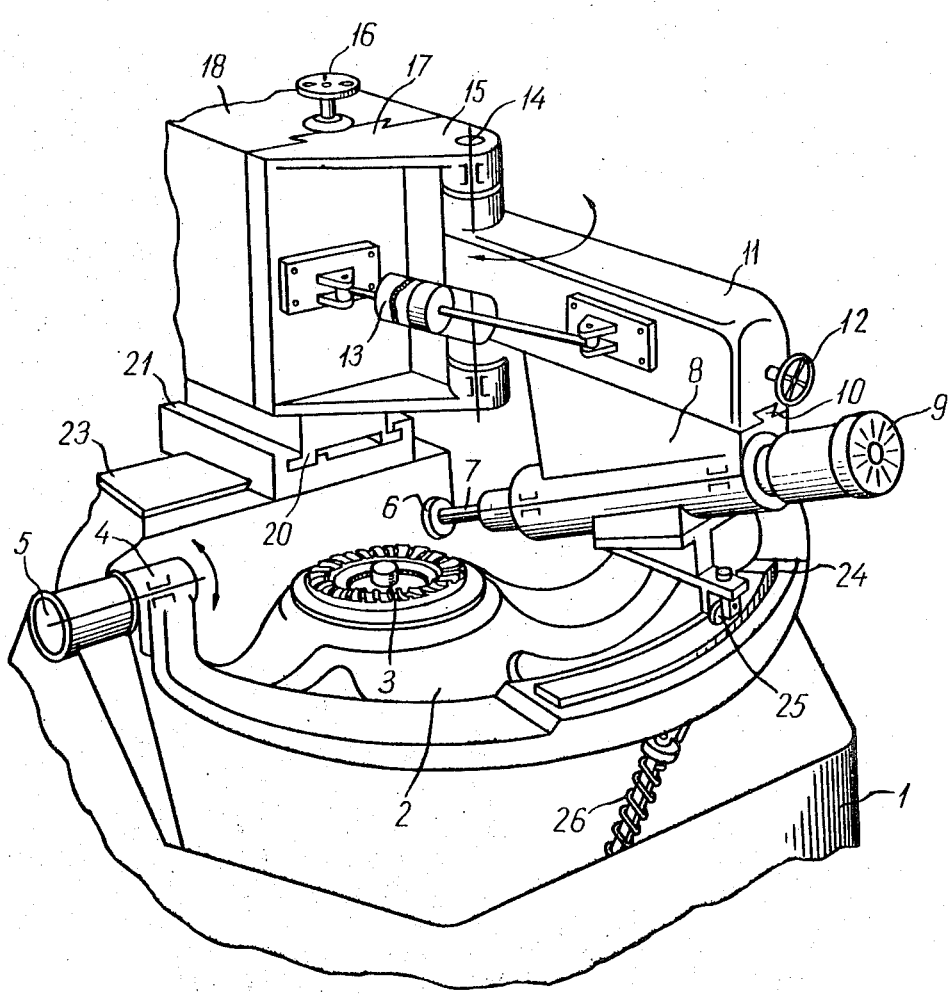
FIG. 1 is a perspective view of the machine tool constructed in accordance with the invention with portions thereof broken away.
Figure 2:
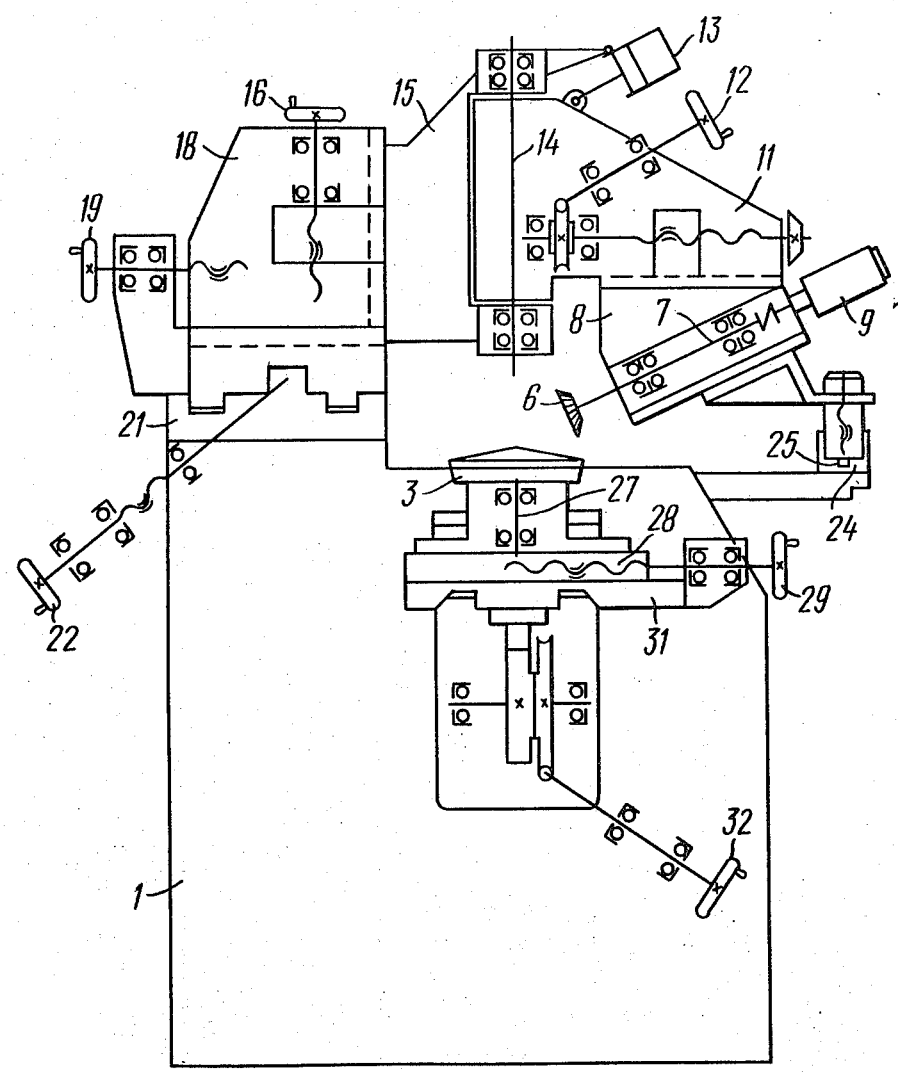
FIG. 2 is a diagram of the drive train of the machine tool.

Referring now to FIG. 1 and 2 of the drawings a machine tool for grinding a tooth side of a spiral bevel gear with a wide pitch angle and a profile angle variable between the tooth ends comprises a bed 1 supporting a carrier 2 with a means for holding a gear blank 3 in a fixed position. According to the invention the carrier 2 is mounted in bearings 4 on axles 5 for swinging about a stationary horizontal axis passing through the axles 5.

Supported on bed 1 there is also a means for carrying a tool 6 comprising a tool-carrying spindle 7 mounted in a tool head 8 and rotatable by an individual motor 9. The tool head 8 is mounted in an angular position upon slideways 10 of a cross-piece 11 and is movable along the slideways 10 by means of a handwheel 12. The cross-piece 11 is adapted to be oscillated by a piston means 13 about a vertical shaft 14 secured on a slide 15. The slide 15 is vertically movable by means of a handwheel 16 along slideways 17 on a slide 18, the latter being also movable by a handwheel 19 along slideways 20 on a slide 21 movable by a handwheel 22 along slideways 23 on the bed 1.

According to the invention a means is provided for effecting simultaneously the swinging movement of the carrier 2 about the stationary horizontal axis passing through the axles 5 and the oscillating movement of the rotary tool 6 about the vertical axis of the shaft 14. Such means comprises a cam member 24 bolted or otherwise removably fixed to the carrier 2, a cam follower 25 secured to the tool head 8 and having a constant contact with the upper contoured face of the cam 24, and a means 26 urging the cam 24 and the cam follower 25 together, for example, a compression spring which reacts between the lower face of the carrier 2 and the bed 1. However, any other suitable urging means can be used instead of a spring.

Referring now particularly to FIGS. 1 and 3 of the drawings the means for holding the gear blank 3 comprises a blank spindle 27 with a dividing device (not shown) vertically mounted on a worktable 28. The worktable 28 is slidably adjustable by means of a handwheel 29 on horizontal guideways 30 on a carriage 31 mounted for angular adjustment by means of a handwheel 32 on curved guideways 33 on the carrier 2.

On the machine tool of the present invention a dish-shaped grinding wheel is employed which is dressed so as to have on the face thereof a cutting portion beveled to the periphery of the wheel, the said cutting portion forming a linear contact with the surface of a tooth side being ground from the top to the bottom thereof (see FIG. 4).

Before starting the operation the machine tool is adjusted for the type and size of the gear to be ground.

The horizontal adjustment of the worktable 28 along guideways 30 and the angular adjustment of the carriage 31 along the curved guideways 33 enables the blank spindle 27 to be set into a proper position relative to the horizontal axis of axles 5 about which the carrier 2 is swingable. In that proper position the stationary horizontal axis about which the carrier 2 swings is tangent to the root line of the tooth side to be ground at a point midway between the tooth ends.

The horizontal adjustment of the slide 18 along slideways 20 and of the slide 21 along slideways 23 enables the axis of the vertical shaft 14 to be set into a proper position relative to the curved surface of the tooth side being ground, the adjustment being such that the vertical axis of the shaft 14 passes through the predetermined center of curvature of the root line of the tooth side being ground.

By adjusting the tool head 8 along horizontal slideways 10 on the cross-piece 11 the grinding wheel 6 is put into a proper radial position relative to the curved surface of the tooth side to be ground, the machining allowance to be removed being taken into account too.

The vertical adjustment of the slide 15 along the slideways 17 enables the grinding wheel 6 to be set for machining across the full height of the tooth.

After the grinding machine has been adjusted in accordance with the above description and the gear blank 3 secured to the blank spindle 27 the operation of the machine is as follows.

The motor 9 for rotating the tool-carrying spindle 7 about its own axis and the piston means 13 for oscillating the cross-piece 11 with the tool head 8 about the axis of the vertical shaft 14 are started into operation. The oscillating movement of the tool head 8 about the vertical shaft 14 causes the grinding wheel 6 to be fed along the length of the tooth side being ground, the cutting portion of the wheel 6 forming a linear contact with the tooth side from the top to the bottom thereof. Simultaneously the cam follower 25 engages and rides upon the upper contoured face of the cam 24. According to the rise and fall of the contoured face of the cam 24 the swinging movement of the carrier 2 with the gear blank 3 about the axles 5 is effected, such movement resulting in the desired variation of the profile angle between the ends of the tooth side being machined.

After having machined one tooth side the grinding wheel comes out of the engagement with the gear blank 3 and the latter is rotated through an angle equal to one tooth space to grind the corresponding side of the next tooth. The dividing device used to rotate the gear blank can be of any known construction and will not be described here.

After having ground all the teeth of the gear blank from one side, the opposite sides of the teeth are ground employing either a different wheel, or the same wheel which has been properly dressed on the opposite side.

The herein-disclosed gear grinding machine is used for machining spiral bevel gears having a wide pitch angle, tooth-rolling dies for producing such gears on gear-rolling machines, and other tools with toothed working surfaces, for example press-forging dies for forging spiral bevel gears having a wide pitch angle.

What we claim is:

1. A machine for form grinding a tooth side of a spiral bevel gear having a wide pitch angle and a profile angle variable between the ends of the tooth, the sides of each tooth being ground having a predetermined radius of curvature, comprising; a stationary machine bed; a gear carrier being supported on said bed so as to be swivable about a horizontal axis; means for fixedly retaining a gear blank to be ground having radially inner and outer tooth end surfaces being mounted on said carrier; means for adjusting the position of said gear retaining means and said gear blank relative to said carrier so that said horizontal swinging axis is tangent to a predetermined plane on said gear blank retaining means; a rotary dish-shaped gear-tooth grinding wheel; a tool head holding said grinding wheel above said gear blank retaining means; means for imparting a predetermined oscillating movement to said rotary grinding wheel about a vertical axis extending through a center of curvature measured with respect to said gear blank retaining means; and means for simultaneously effecting the swinging motion of said carrier and the oscillating motion of said rotary grinding wheel, said last-mentioned means comprising a cam mounted on said carrier, a cam follower mounted on said tool head, and means urging said cam and cam follower into constant contact with each other, whereby the grinding wheel and the gear blank have relative motion imparted thereto so as to obtain spiral surfaces on the side surfaces of the teeth of spiral bevel gears with a wide pitch angle and the surfaces thus obtained have different profile angles in different sections along the normal of the same tooth.

2. A machine according to claim 1 in which the said means for effecting the oscillation movement of the said rotary grinding wheel comprises a slide with a vertical shaft mounted thereon, a cross-piece mounted for oscillation on the said vertical shaft and supporting the said tool head, and a piston means connecting the said cross-piece and slide.

* * * * *